Nov. 16, 1965  J. S. RODGERS  3,217,799
STEAM CONDENSER OF THE WATER TUBE TYPE
Filed March 26, 1962  7 Sheets-Sheet 1
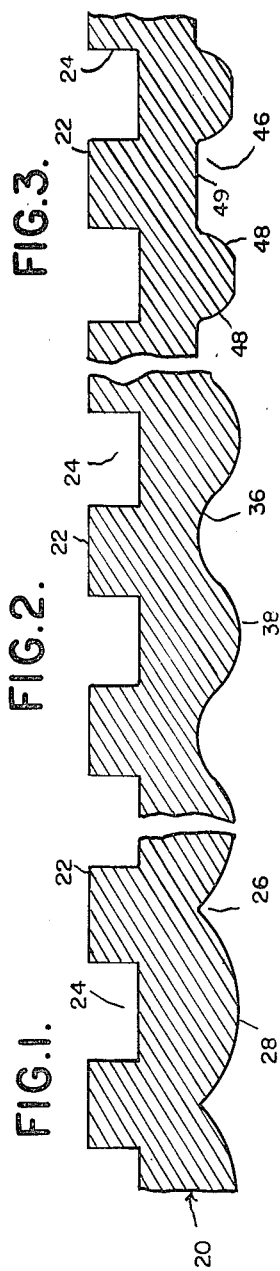
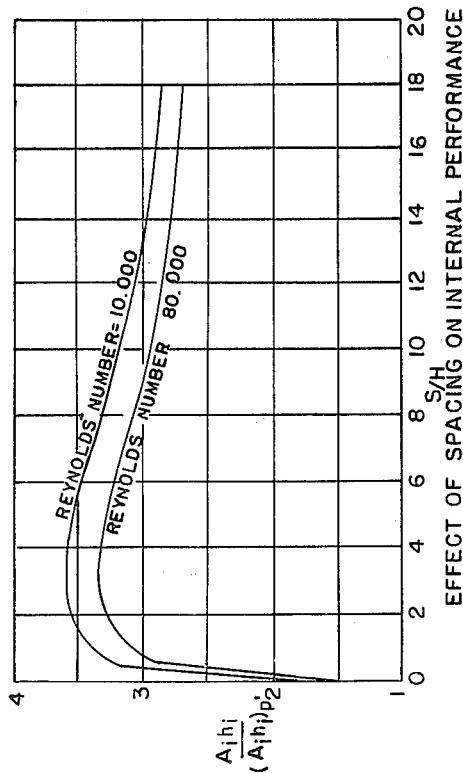
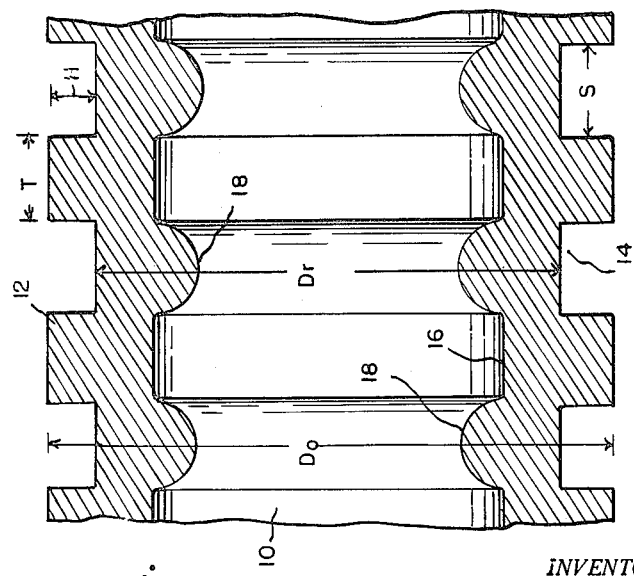
INVENTOR.
JAMES S. RODGERS
BY
ATTORNEYS

FIN FREQUENCY NUMBER OF FINS. PER. INCH

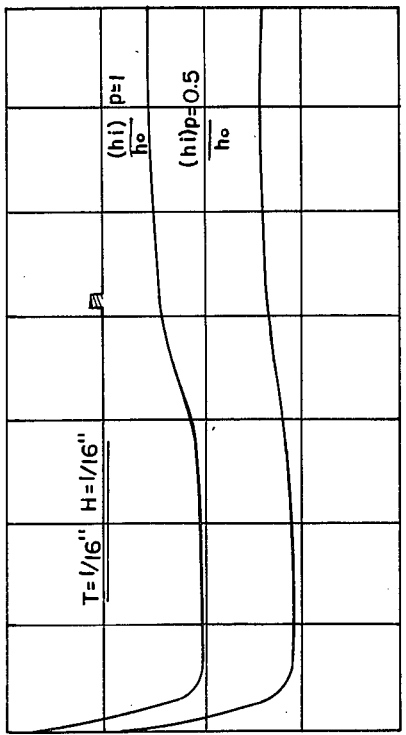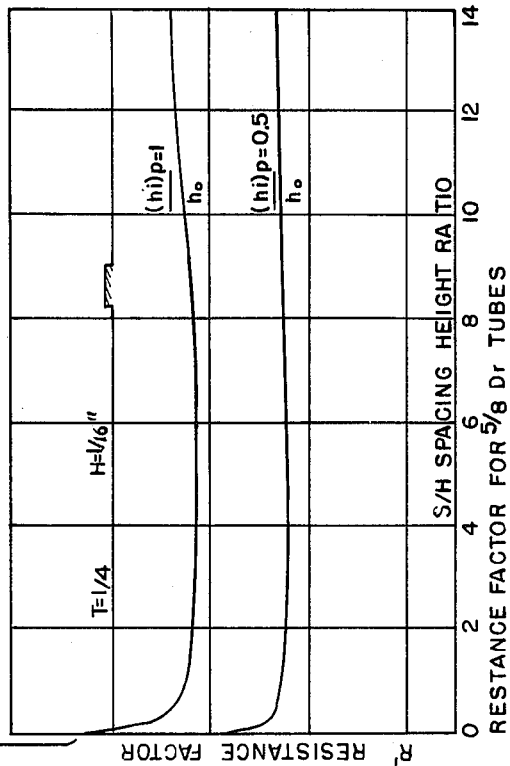
FIG. 7B.
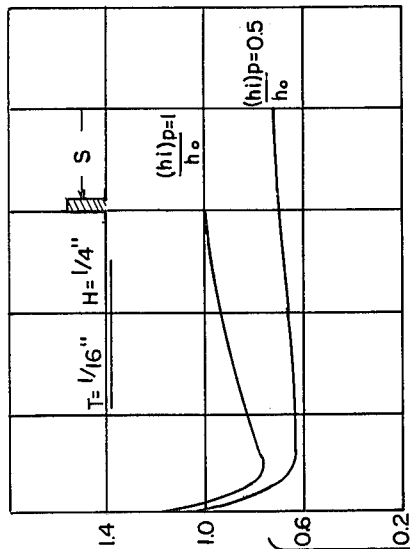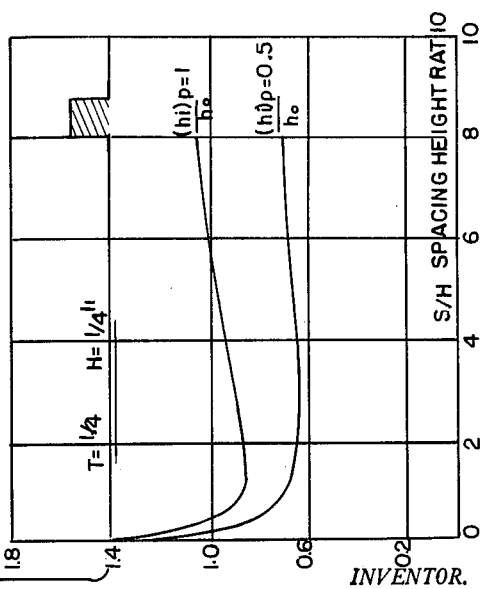
FIG. 7A.

Nov. 16, 1965    J. S. RODGERS    3,217,799
STEAM CONDENSER OF THE WATER TUBE TYPE
Filed March 26, 1962    7 Sheets-Sheet 4
FIG.7D.
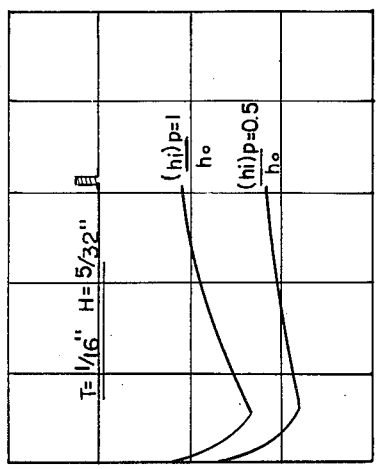
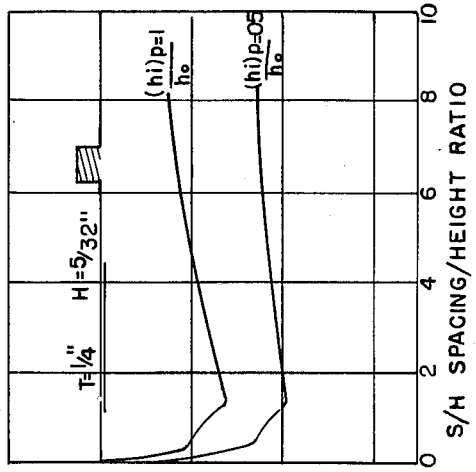
FIG.7C.
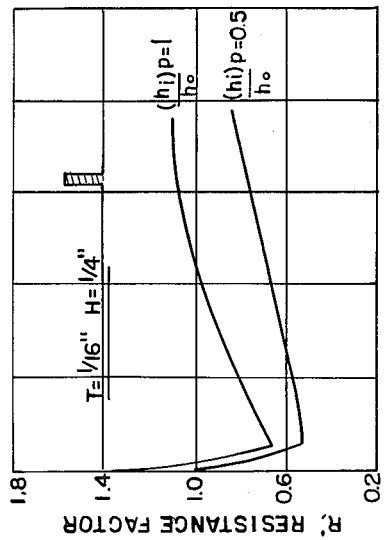
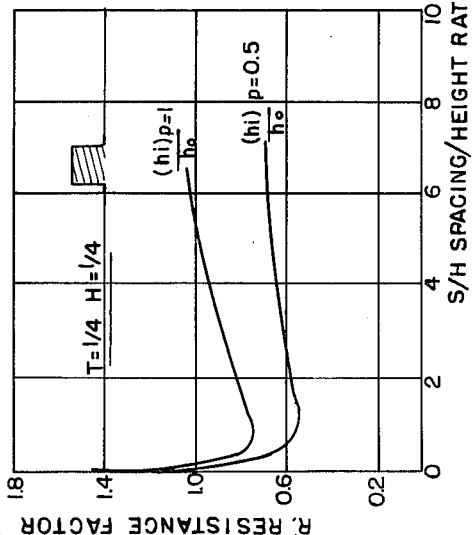
INVENTOR.
JAMES S. RODGERS
BY
ATTORNEYS

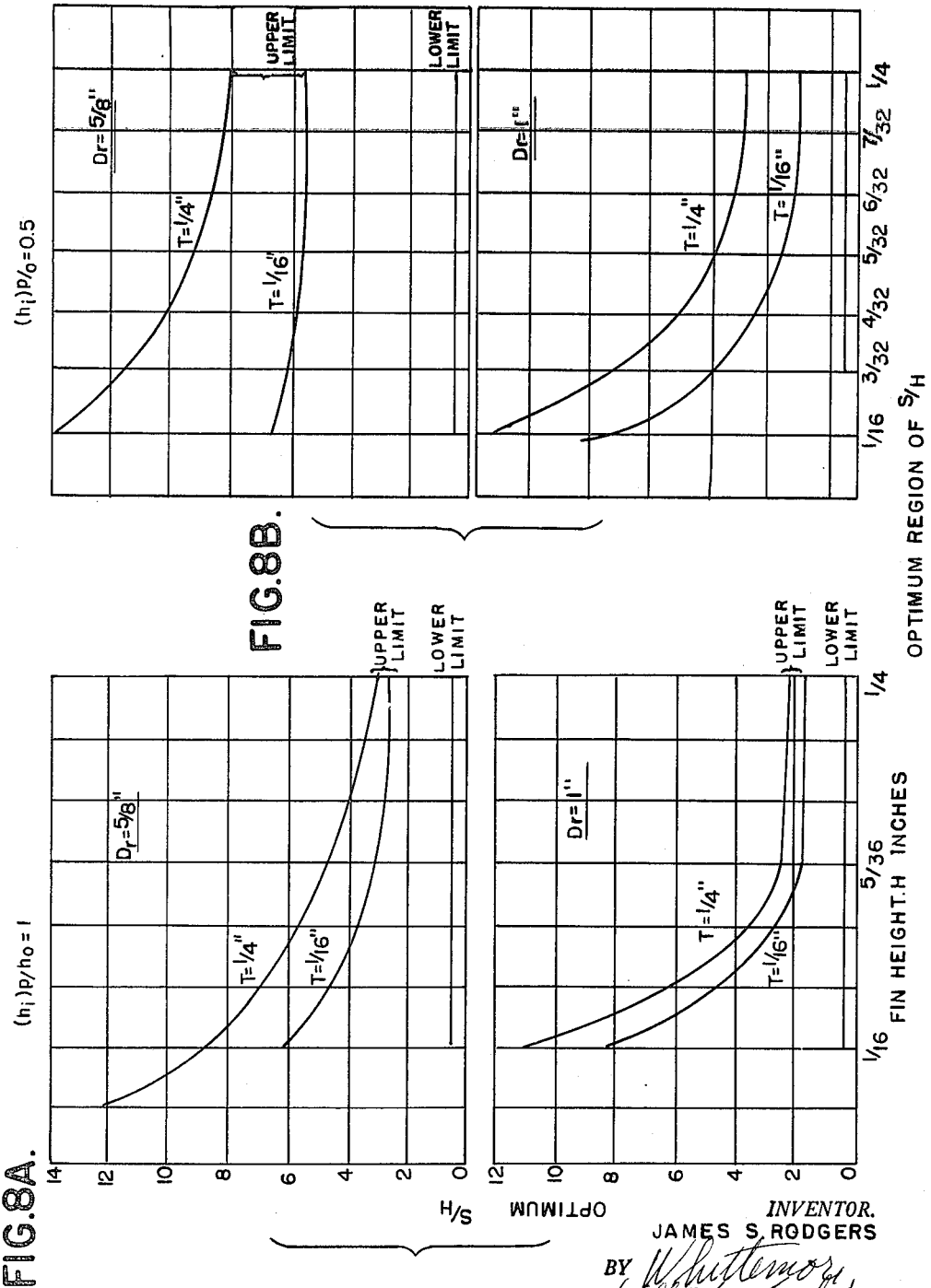

Nov. 16, 1965   J. S. RODGERS   3,217,799
STEAM CONDENSER OF THE WATER TUBE TYPE
Filed March 26, 1962   7 Sheets-Sheet 7
FIG.9.
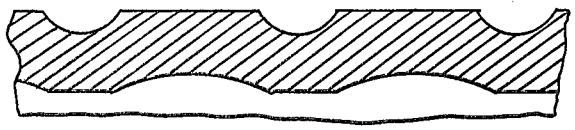
FIG.10.
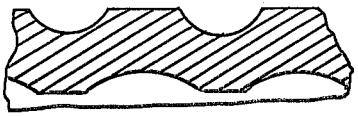
FIG.11.
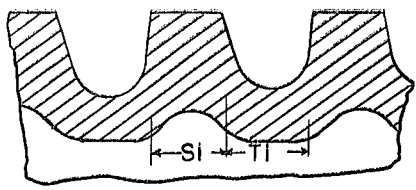
FIG.13.
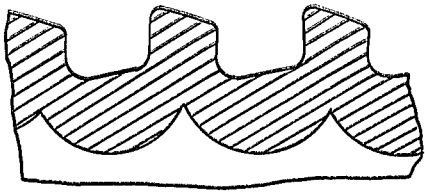
FIG.12.
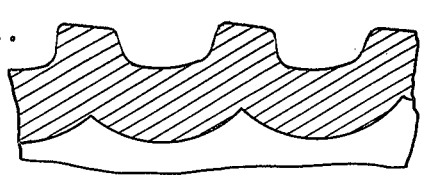
FIG.15.
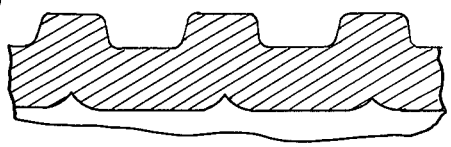
FIG.14.
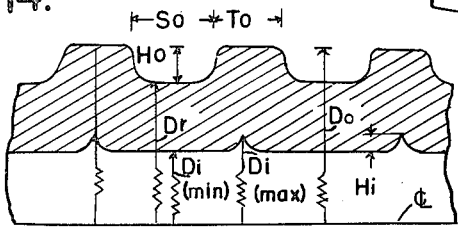
FIG.17.
FIG.18.
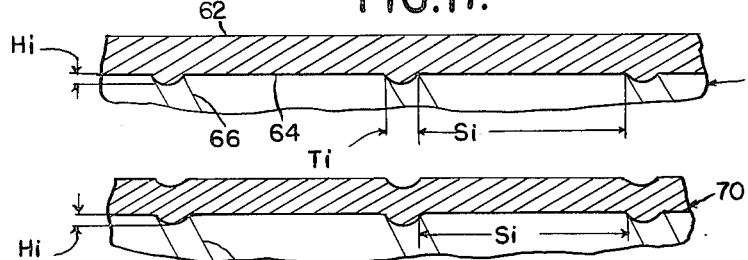
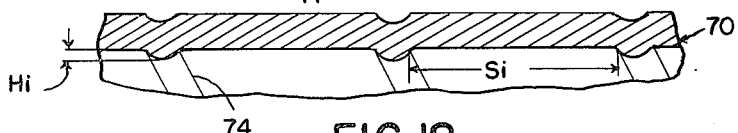
FIG.16.
FIG.19
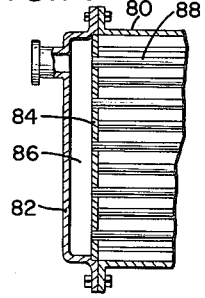
INVENTOR.
JAMES S. RODGERS
BY Whittemore,
Hulbert & Belknap
ATTORNEYS

United States Patent Office 3,217,799
Patented Nov. 16, 1965

3,217,799
STEAM CONDENSER OF THE WATER
TUBE TYPE
James S. Rodgers, Dearborn, Mich., assignor to Calumet
& Hecla, Inc., Allen Park, Mich., a corporation of
Michigan
Filed Mar. 26, 1962, Ser. No. 184,634
9 Claims. (Cl. 165—179)

The present invention relates to a steam condenser of the water tube type.

The present application is a continuation-in-part of my prior copending application Serial No. 862,404, filed December 28, 1959, now abandoned.

In this type of condenser steam is admitted to a closed space containing a multiplicity of parallel horizontal tubes cooled by a flow of water therethrough. The steam is condensed by contact with the cool outer surface of the tube and drains off the tube to the bottom of the enclosed space from whence it is withdrawn.

In some applications a prime consideration is the space occupied by a steam condenser of a given capacity. Compactness of the condenser is of course contributed to by closely spacing the water tubes and by providing a maximum heat transfer efficiency between the outer and inner surfaces of the tubes to transfer heat given up by the condensing steam to the cooling water.

It has been found that the overall rate of heat transfer through the walls of the water tubes is generally determined by the heat transfer capacity of either the inner or the outer surface of the tube. If one of the two surfaces has substantially less heat transfer capacity than the other, it limits the heat transfer through the tube wall and the ability of the other surface to transmit more heat per unit of area is not fully utilized. Accordingly, the first consideration is to determine which of the two surfaces has the lesser heat transfer capacity and to modify this surface to increase its heat transfer capacity so as to be at least equal to the heat transfer capacity of the remaining surface.

In general, the heat transfer capacity of either the inner or the outer surface of the water tubes is a direct function of the exposed area and accordingly, where limitation to overall heat transfer is imposed largely by the outer surface, the heat transfer capacity of this surface may be increased by providing increased area in the form of fins.

Rather surprisingly however, in a steam condenser, it has been determined that in general the surface imposing the most resistance to, or having the least capacity for, heat transfer is not the outer surface but is instead, the inner surface of the water tube. In accordance with the present invention, the inner surface of the water tubes is modified in a particular way so as to increase heat transfer per unit of area of the tube and this is accomplished in a manner which minimizes the increase to resistance to flow of water through the tube. By a particular modification of the inner surface of the tube, as will subsequently appear, its heat transfer capacity is so effectively increased that in many cases the heat transfer capacity of the inner surface per unit of area exceeds the heat transfer capacity of the outer surface, unless the outer surface is also modified as will appear herein. This of course depends to some extent upon the character of the surface at the outside of the tube and whether or not steam condensation is mainly drop-wise or film-wise. Where steam condensation is mainly film-wise, a proper modification of the inner surface of the tube may provide heat transfer capacity per unit of length which substantially exceeds the heat transfer capacity of the outer surface of the tube and in this case the outer surface of the tube will be modified as disclosed herein.

Another important consideration in the production of a compact efficient water tube steam condenser is a design of tube which permits close packing of the tubes without interference between adjacent tubes. Among other things, this consideration leads to a limitation on the height of fins provided on the exterior of the tube. A second important consideration however, is that any fin structure provided on the outer surface of the tube must be of such a character as to eliminate or at least substantially minimize any tendency of the condensed water tube to be trapped between adjacent fins or to cause "flooding" of the tubes. This calls for a careful selection of the ratio of the spacing of the external fins to the height thereof.

With the foregoing general statements in mind it is an object of the present invention to provide a water tube steam condenser characterized by its overall volumetric efficiency.

It is a further object of the present invention to provide a water tube steam condenser in which the tubes are modified so as to have substantially equal heat transfer capacity per unit of length at the inner and outer surfaces thereof.

It is a further object of the present invention to provide a tube for a water tube steam condenser which exhibits substantially greater heat transfer capacity from steam exterior of the tube to water flowing within the tube than exhibited by plain tubing.

It is a further object of the present invention to provide a tube for a water tube steam condenser in which the inner surface is provided with a multiplicity of generally circumferentially extending ridges, disposed as spaced annuli or in a helical configuration, in which the ratio of the axial spacing between the ridges to the height thereof is between 5/1 and 15/1.

It is a further object of the present invention to provide a tube of the type referred to in the preceding paragraph in which the height of the internal ridges is between .005 and 0.075".

It is a further object of the present invention to provide tubes as suggested in the two immediately preceding paragraphs, in which the outside diameter of the tubing is generally btween a half inch and an inch and a half, and in which the height of the internal ridges for the smaller tubing is in the lower end of the range .005– 0.075, and for the larger tubing is in the upper end of said range.

It is a further object of the present invention to provide a tube of the type referred to having its interior surface modified to increase its heat transfer capacity and having at its outer surface a series of fins extending generally around the tube, either a series of circular fins or one or more continuous helical fins, in which the ratio between the spacing between adjacent fins and the height thereof exceeds 0.35.

It is a feature of the present invention to provide a steam condenser tube of the character referred to having axially spaced fin portions at its exterior surface and axially spaced ridge portions at its inner surface, the interior ridge portions lying opposite to the space between adjacent exterior fin portions and being of substantially less height than the height of the fin portions, the ratio between axial spacing of adjacent ridge portions to ridge height being between 5/1 and 15/1, and the ratio between the axial spacing or adjacent exterior fin portions to the height of the exterior fins exceeding 0.35.

Other objects and features of the invention will become apparent as the description proceeds, especially when taken in conjunction with the accompanying drawings, illustrating preferred embodiments of the invention, wherein:

FIGURE 1 is a fragmentary axial section of a finned water tube constructed in accordance with the present invention.

FIGURES 2 and 3 are views similar to FIGURE 1, illustrating permissible variations in the shape of the inner tube surface.

FIGURE 4 is a fragmentary section of a tube constructed in accordance with the present invention to which applied various dimensional identifying letters used in calculations herein.

FIGURE 6 is a graph showing the effect of spacing of internal ridges on the heat transfer coefficient of the internal tube surface.

Figure 7E:
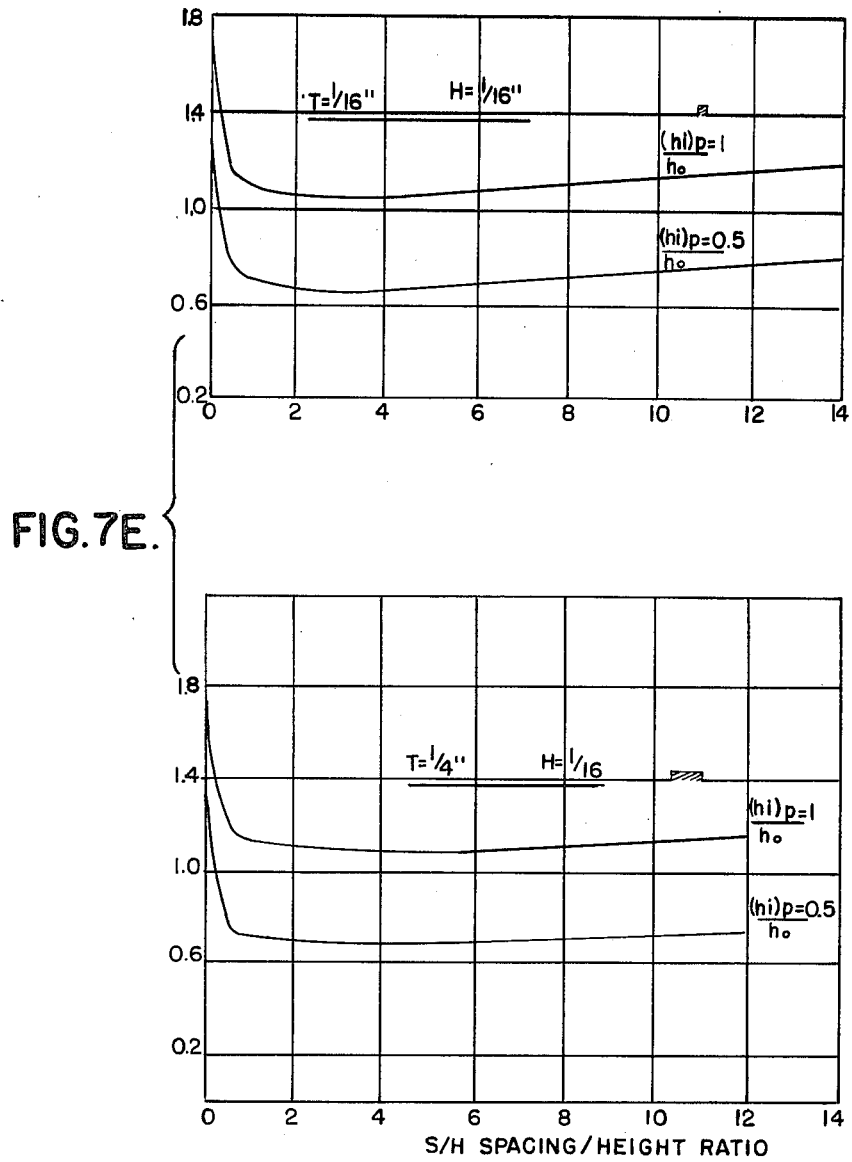

FIGURES 7A, 7B, 7C, 7D, and 7E are graphs showing variations in the overall resistance factor of the tube as influenced by the space-height ratio of the external fins.

FIGURES 8A and 8B are graphs showing the proper space-height ratio for different tube designs for most efficient overall operation.

FIGURES 9–16 are enlarged fragmentary sectional views showing a variety of specifically different tube designs.

FIGURES 17 and 18 are fragmentary sectional views on a somewhat different scale of tubes designed primarily to increase the heat transfer capacity of the inner tube surface.

FIGURE 19 is a fragmentary side view of a steam condenser made in accordance with the present invention.

In commercial steam condensers, cold water is passed through tubes and steam is condensed on the outside surface of the tubes. The performance of steam condensers, as measured by the heat transfer rate per unit length of tubing, depends on a number of factors including the tube configuration.

This discussion concerns tube configuration as it affects the tube surface area and the turbulence of the coolant fluid. Heat transfer performance usually is improved by increasing the tube surface area and by increasing turbulence in the fluids involved. However, it will be shown that the processes which are usually thought to improve tube performance can actually be deleterious under some circumstances and that there is an optimum in the general sense.

*Basic heat transfer relationships*

The basic relationship governing heat transfer in condensers may be written $$\frac{Q}{TD}=\frac{1}{\frac{1}{h_0 A_0}+\frac{1}{h_i A_i}+r} \quad (1)$$

where $Q/TD$ is the heat transfer rate per mean temperature difference driving force for a tube of unit length,
$h_o$ is the heat transfer coefficient at the tube outer surface,
$h_i$ is the heat transfer coefficient at the tube inner surface,
$A_o$ is the tube external surface area per unit length,
$A_i$ is the tube internal surface area per unit length, and
$r$ is a factor which includes the resistance to heat transfer of the tube metal and of any dirt or scale which may be deposited on the tube.

The factor $r$ is fixed by the condenser service conditions including operating pressure, operating temperature, and cleanliness of the fluids involved. As a result, this factor may not be varied at will, and it may be considered a constant independent of tube configuration.

The factors $1/h_o A_o$ and $1/h_i A_i$ do depend on tube configuration. These factors may be thought of as resistances to heat transfer which should be minimized.

*External tube performance*

In steam condensing, liquid condensate is formed on the outer surface of the heat transfer tube. This liquid condensate may be retained on the tube surface by surface tension effects where it acts to a large degree as an insulator.

If the fins on an extended surface tubing are relatively close together the surface may be completely covered with liquid except at the maximum fin periphery. This condensate retention is referred to in the heat transfer industry as "flooding."

The water tubes in the steam condenser will of course be positioned horizontally or substantially horizontally so that condensate formed on the exterior surfaces of the tubes and particularly between the fins thereof, may most readily drain off the tubes. Under certain circumstances condensate may flow to the lower portion of the space between adjacent fins or convolutions of fins and be retained therein in a generally pie-shaped zone subtending an angle having its apex at the center of the tube.

The fraction of the surface which is covered by liquid can be calculated by a simple force balance. As an illustration, consider the case of condensate retention between the fins with rectangular cross-section as shown at the bottom of FIGURE 4. By a force balance, it can easily be shown that $$\frac{a}{\sin a}=\frac{8t}{dg}\left[\frac{2D_0-D_r+S}{(D_0^2-D_r^2)S}\right] \quad (2)$$

where $a$ is one-half the angle subtended by the pie-shaped zone of liquid between the fins,
$d$ is the density of the condensate,
$t$ is the surface tension of the condensate,
$g$ is the acceleration due to gravity,
$D_o$ is the fin outer diameter,
$D_r$ is the fin root diameter, and
$S$ is the space between fins in the direction of the tube axis.

Suppose a tube is of constant dimensions except for $S$, the space between fins. For large $S$, no liquid is retained between the fins. As $S$ is reduced, $a$ will increase until $a=\pi$ radians (or $a=180°$) at which point liquid completely fills the space between the fins. At any spacing $a/\pi$ is the fraction of the surface area (excluding fin tip area) which is occluded by condensate.

In computing the heat transfer resistance, the liquid retention effect must be taken into account. As was mentioned earlier, the external resistance is given by $1/h_o A_o$. To account for liquid retention, $A_o$ will be replaced by $A_e$ which is defined to be the effective surface area, the surface area not occluded by condensate.

Figure 5A:
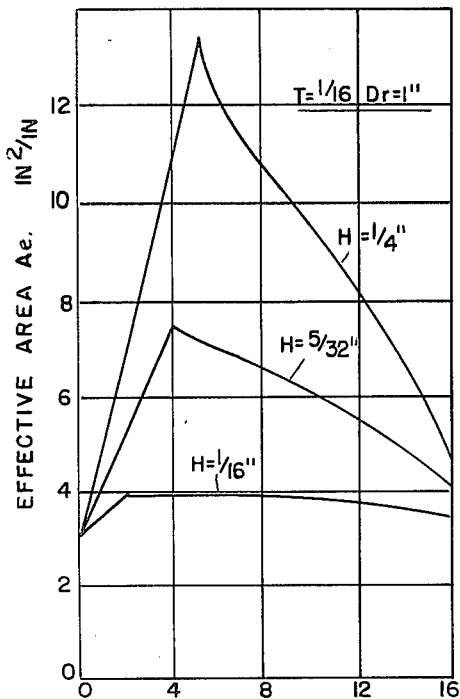
FIGURES 5A, 5B, 5C and 5D are graphs showing the effect of variation in number of fins per inch in the effective external tube area.
Figure 5B:
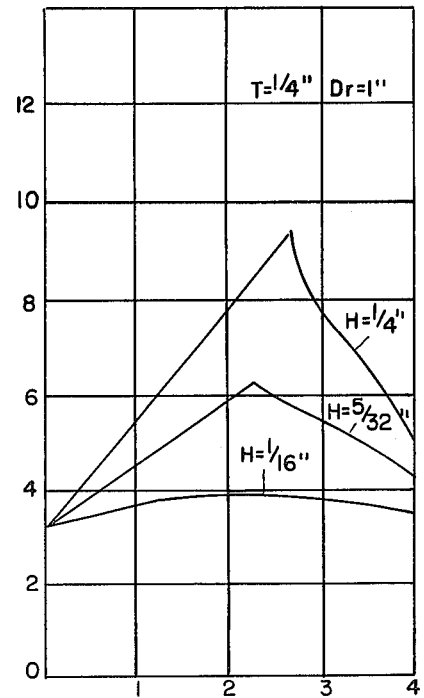
Figure 5C:
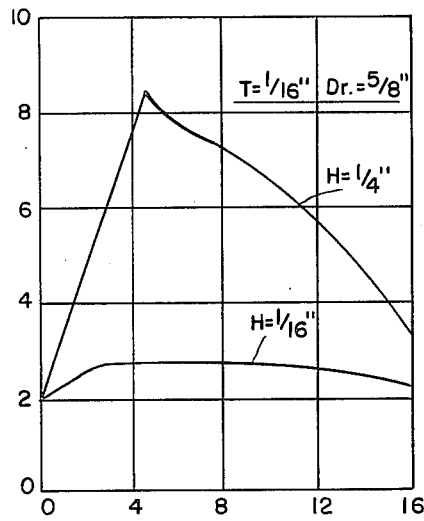
Figure 5D:
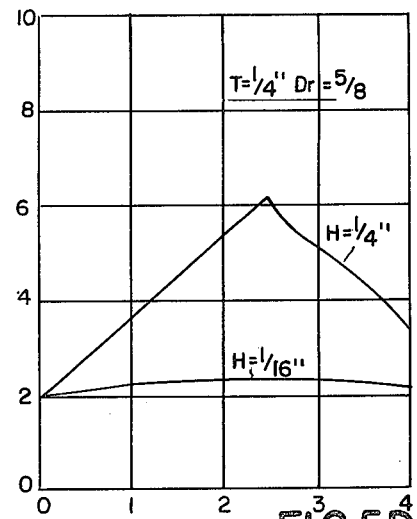

Effective surface areas have been calculated for tubes of several different dimensions as shown in FIGURE 5. Conclusions which may be drawn from the calculations include:

(1) The effective heat transfer surface area increases linearly with increasing number of fins per inch only up to the point of incipient liquid rentention. The effective surface area decreases rapidly beyond this point because of liquid retention despite the fact that the total surface area is increasing.

(2) An effective area near the maximum is obtained for only a very narrow region of fin spacing in all cases of ¼ inch fin height. For lower fin heights, the maximum becomes more nearly flat so that fin spacing becomes a less crucial variable.

*Internal tube performance*

It is well known that turbulence in a fluid stream flowing in a tube promotes heat transfer. It is also known that transverse curvature of the tube wall (or transverse internal ridges) will cause higher turbulence than would be expected from a smooth, cylindrical tube. Transverse curvature of an inner tube wall has the additional important effect of increasing the surface area per unit length for heat transfer over that of a smooth, cylindrical tube. However, as will be discussed below, the heat transfer performance of a tube is not increased indefinitely by indefinitely increasing the number of transverse ridges. There is an optimum beyond which increasing the number of transverse ridges is deleterious.

As an illustration, consider internal transverse ridges of semi-circular cross-section as indicated at 18 in FIGURE 4. If the ridges are a great distance apart the tube will tend to perform as a plain tube. As the ridge spacing is reduced, turbulence in the flowing stream is increased which in turn increases the heat transfer coefficient. However, when the ridge spacing is sufficiently reduced, circulation of the fluid between the ridges is hindered and the ridges become less effective. The fluid between the ridges becomes essentially stagnant. In the limit, if the ridges are such that no space at all exists between them, the inner tube surface is once again a plain surface. In short, there is a point of maximum performance with respect to ridge spacing.

The effect of ridge spacing on performance has been investigated experimentally and reported in the literature. FIGURE 6 shows the ratio $A_1h_1/(A_1h_1)_p$, where the subscript $p$ denotes a tube having a plain interior surface, as a function of the ridge spacing to height ratio. The conclusions from this work include:

(1) The performance ratio, $A_1h_1/(A_1h_1)_p$, is as much as 3.6 at the maximum point. That is to say, an internally ridged tube may have less internal resistance to heat transfer than a plain tube by the factor 3.6.

(2) The Reynolds' number of the fluid does not have much effect on the performance ratio, at least in the range of practical importance. This statement is equivalent to saying the performance ratio is approximately independent of fluid bulk velocity or viscosity. It is understood that the plain and internally ridged tubes are compared at the same fluid bulk velocity and viscosity.

While the foregoing observations and conclusions are valid, further tests of a variety of tubes to determine the most efficient design for water tube condensers has led to the following further conclusions:

In the first place, the overall steam condensing efficiency of prime tubes as heretofore used in water tube steam condensers can be significantly increased by modification of the tubes to provide for an increase in heat transfer through the tube. Moreover, it is possible to increase the heat transfer capacity of the tube without producing an increase in the resistance to flow of water through the tube sufficiently great to cancel out the effect of the heat transfer capacity. In other words, with a given pressure drop of water across the tube and with the water supplied to the tubes at a constant temperature, it is possible to produce a significant increase in the overall rate of heat transfer from the exterior of the tube to the water flowing through the interior thereof.

While it was initially supposed that the most important tube modification to increase overall heat transfer efficiency would be to the exterior tube surface, it has been found that actually the major improvement in overall efficiency results from a modification to the interior surface of the tube. As a matter of fact, it has been found that, dependent upon the specific character of the exterior surface of the tube, in many cases no modification of the exterior surface of the tube is required to take care of the maximum heat transfer capacity which can be imparted to the interior surface of the tube. In some cases however, where the character of the exterior surface is such as to cause condensation to be more in the nature of film-wise condensation than drop-wise condensation, then the exterior surface of the tube should be extended by the formation of fins thereon.

The problem of increasing the heat transfer capacity per unit area at the interior surface of the tube is the problem of increasing the turbulence of flow without at the same time providing such an increase to the resistance of flow through the tube as to nullify the overall efficiency thereof.

Tests of water tubes of the types disclosed herein indicate that turbulence may be maintained at a level sufficient to provide for maximum heat transfer by the provision of extremely shallow ridges. It has been found that ridges of a height as low as .005 inch are effective for this purpose. In fact, it appears that ridges of even less height may be effective but it is believed that a practical lower limit of .005" is required because of the difficulty of maintaining and controlling ridge height over lesser values.

At a ridge height of about .025, for smaller tubes having an outside diameter of about a half inch, the increase in power required to overcome the increased resistance to flow resulting from the turbulence inducing ridges is such that overall efficiency of a condenser is reduced if ridge height is increased. For larger tubes, ridge height may be increased generally proportionately, so that for an inch and a half tube a ridge height of .075" is not excessive.

On the other hand, surprisingly great increase in heat transfer capacity results in providing even the lowest practical height of ridges (about .005") in either large or small tubes, so long as the ratio of spacing between adjacent internal ridges $S_i$ to internal ridge height $H_i$ is between 5:1 and 15:1, and a very satisfactory ratio is about 10:1.

Significant in the promotion of more turbulent flow within the tube is the spacing of the ridges. Best results have been obtained when the ratio between the spacing of the ridges to ridge height is about 10/1, and definitely within the range of 5/1 to 15/1. Moreover, this relatively large ratio provides less increase in the resistance to flow than smaller ratios.

Referring now to FIGURES 17 and 18 there are shown fragmentary tube sections in which the modification of the internal surface is the prime consideration.

In FIGURE 17 there is shown a fragmentary section of a tube 60, the exterior surface 62 of which is indicated as a smooth surface, whereas the internal surface 64 is modified by providing internally projecting ridges 66. As indicated in this figure, these ridges extend helically although they may if desired be provided in the form of circumferentially extending ridges. The spacing of the ridges as designated by $S_1$, is relatively great as compared to the height $H_1$. In the modification illustrated in FIGURE 17, it will be noted that the mean thickness $T_1$ of the ridges 66 is relatively small as compared to the spacing.

FIGURE 17 illustrates a tube which may not be practical to make inasmuch as the production of either circular or helical ridges 66 at its interior without modification of the exterior surface, would be difficult. However, the tube 70 shown in FIGURE 18 has the exterior surface modified substantially similarly to the interior surface of the tube 60 shown in FIGURE 17. This is accomplished by rolling grooves or channels 72 in the exterior surface of the tube opposite the portions where it is desired to produce the ridges 74. While this of course, somewhat extends the exterior surface of the tube, this tube extension in this case may or may not be required. If it is required to bring the heat transfer capacity per unit area of the exterior surface up to that of the modified interior surface, then of course the modification of the exterior surface must be in accordance with the disclosure described previously.

In this figure it will be observed that the ratio of $S_i/H_i$ is approximately 10/1, which is the optimum ratio for overall performance efficiency.

*Optimum tubing*

Consider tubing which has circumferential external fins and internal ridges. The fins and ridges discussed here are understood to be at least partly transverse. That is to say that strictly longitudinal fins and ridges are excluded, whereas helical and strictly transverse fins and ridges are included.

For convenience, the resistance to heat transfer due to the external coefficient $h_o$ and internal coefficient $h_i$, as indicated in Equation 1 will be combined to give the heat transfer resistance R which is dependent on tube configuration:

$$R = \frac{1}{A_e h_0} + \frac{1}{A_i h_i} \quad (3)$$

Equation 3 may be multiplied by $(A_i h_i)_p$ to give $$R' = R(A_i h_i)_p = \frac{(A_i h_i)_p}{A_e h_0} + \frac{(A_i h_i)_p}{A_i h_i} \quad (4)$$

The optimum tube is clearly one for which R' is a minimum. The quantities $(A_i h_i)_p/A_i h_i$ and $A_e/(A_i)_p$ can be evaluated for any given tube by the methods discussed above. The factor $(h_i)_p/h_o$ may be taken to be a constant independent of tube configuration. This ratio, $(h_i)_p/h_o$, is usually on the order of ⅔ for steam condensing. However, it also depends on the many condenser design and operating variables other than tube configuration.

Values of R' have been computed for a number of tubes as shown in FIGURES 7A to 7E. The values were computed for $(h_i)_p/h_o=1$, and for $(h_i)_p/h_o=0.5$ to cover the practical range. Note that in each case there is a minimum R' at some value of fin spacing to fin height ratio (S/H). The optimum cannot be expected to be attained exactly in commercial practice. For this reason, an "optimum range" will be considered. The optimum range of S/H ratios is defined to be the region of S/H values for a given tube configuration where R' is within ten percent of the minimum R'.

In FIGURES 7A to 7E it will be observed that the several different curves are drawn for different values of fin thickness of T and H. In each of these curves there is included a cross-section of a fin having the assumed dimensions of height and thickness.

The optimum range of S/H ratios in presented in FIGURES 8A and 8B as a function of tube configuration variables. A single lower line represents the minimum limit of S/H values in the optimum range. The upper limit of optimum S/H is represented by a family of lines since the upper limit varies with tube diameter and fin thickness as well as with fin height.

The following conclusions may be stated:

(1) For steam condensing, tubing with both internal and external extended surface can be more effective than plain, smooth tubing.

(2) There is an optimum range with respect to fin spacing and ridge spacing where tube performance is near the maximum.

(3) The fin and ridge spacing to height ratio must always exceed 0.35 for optimum performance.

(4) The fin and ridge spacing to height ratio must be less than some upper limit for optimum performance. This upper limit is given graphically in FIGURES 8A and 8B.

Referring now to FIGURE 4 there is shown a tube 10 having an outside or fin root diameter $D_r$, and an outside diameter $D_o$ measured to the outside of the fins 12. The outside fins 12 have a mean width or thickness dimension T and a mean height H. The space 14 between adjacent fins or convolutions of fins has the dimension S. In this figure the grooves or channels 16 at the inner surface of the tube 10 are separated by the ridges 18 which as will be apparent from the figure are opposite the spaces 14 between adjacent fins 12.

As shown in FIGURE 1, the tube herein designated 20 is provided with fins 22 whose thickness is substantially equal to the width of the space 24 between adjacent fins. At the inner surface of the tube the grooves or channels 26 are defined by the intersection between convexly curved ridges 28.

In FIGURE 2, while the external fins 22 and spaces 24 are as shown in FIGURE 1, the inner grooves or channels 36 are associated with the intermediate ridges 38 in such a way that a smooth continuous undulating interior surface is obtained.

In FIGURE 3, while again the fins 22 and spaces 24 are as shown in FIGURE 1, the grooves or channels 46 formed between the adjacent ridges 48 are relatively wider and have flat bottom portions 49 blending smoothly into the side surfaces of the ridges 48. In addition, the crests of the ridges 48 are shown as flat, a condition which results from carrying out the exterior finning operation with a cylindrical mandrel within the tube. By this operation accurate control of the final inside tube diameter is maintained.

The tube structure indicated in FIGURES 1, 2 and 3 is more or less diagrammatic and illustrates assumed or theoretical shapes.

Referring now to FIGURES 9–16 there are shown some actual cross-sections of condenser tubes which have been given practical tests in water tube steam condensers. The water tubes are to have an outside diameter of between 0.50 and 1.50", and it will be observed that the tubes illustrated in FIGURES 9–16 all have outside diameters closer to the minimum of this range. Tubes of this approximate dimension are preferred.

In FIGURES 11 and 14 the various dimensions of the tube have been designated by the symbols which are identified below:

$D_o$—Outside diameter measured at fin crests,
$D_r$—Outside root diameter measured at the bottoms of the spaces between adjacent fins,
$D_{i_{max}}$—Maximum internal diameter measured at the bottoms of the grooves or channels between adjacent internal ridges,
$D_{i_{min}}$—Minimum internal diameter measured at the crests of the internal ridges,
$S_o$—Spacing between adjacent external fins,
$T_o$—Thickness of external fins,
$H_o$—Height of external fins,
$H_i$—Height of internal fins,
$fpi$—Fins per inch,
$S_i$—Space between internal ridges,
$T_i$—Thickness of internal ridges,
$S_o/H_o$—Ratio of fins spacing to fin height.

The fins of FIGURES 9–16 have dimensions as set forth in the following tabulation:

|  | Figure 9 | Figure 10 | Figure 11 | Figure 12 |
|---|---|---|---|---|
| $D_o$ | 0.617 | 0.617 | 0.613 | 0.7271 |
| $D_r$ | 0.566 | 0.566 | 0.473 | 0.638 |
| $D_{i_{max}}$ | 0.502 | 0.502 | 0.437 | 0.5773 |
| $D_{i_{min}}$ | 0.471 | 0.471 | 0.376 | 0.4925 |
| $S_o$ | 0.056 | 0.056 | 0.078 | 0.0863 |
| $T_o$ | 0.161 | 0.070 | 0.075 | 0.0608 |
| $H_o$ | 0.0252 | 0.0252 | 0.070 | 0.044 |
| $H_i$ | 0.015 | 0.015 | 0.030 | 0.042 |
| $fpi$ | 4.85 | 4.85 | 6.65 | 6.8 |
| $S_i$ | 0.154 | 0.085 | 0.095 |  |
| $T_i$ | 0.042 | 0.042 | 0.058 |  |
| $S_o/H_o$ | 2.24 | 2.24 | 1.16 | 1.95 |

|  | Figure 13 | Figure 14 | Figure 15 | Figure 16 |
|---|---|---|---|---|
| $D_o$ | 0.7256 | 0.7180 | 0.7226 | 0.7181 |
| $D_r$ | 0.592 | 0.646 | 0.632 | 0.644 |
| $D_{i_{max}}$ | 0.5466 | 0.5427 | 0.5707 | 0.5453 |
| $D_{i_{min}}$ | 0.4449 | 0.5141 | 0.5191 | 0.5168 |
| $S_o$ | 0.087 | 0.0831 | 0.0802 | 0.0837 |
| $T_o$ | 0.0615 | 0.0659 | 0.1154 | 0.0638 |
| $H_o$ | 0.0668 | 0.036 | 0.045 | 0.037 |
| $H_i$ | 0.0508 | 0.0143 | 0.0258 | 0.0142 |
| $fpi$ | 6.7 | 6.7 | 5.1 | 6.8 |
| $S_i$ |  | 0.0608 | 0.088 | 0.0569 |
| $T_i$ |  | 0.0881 | 0.1076 | 0.0906 |
| $S_o/H_o$ | 1.30 | 2.32 | 1.78 | 2.26 |

It will be noted that the ratio $S_o/H_o$ varies from approximately 2.3 for the tube shown in FIGURE 14 to 1.2 for the tube shown in FIGURE 11. The external configuration of the tubes shown in FIGURES 11 and 13 has been found by actual tests to be less desirable than the external configurations of the tubes shown in FIGURES 9, 10, 12, 14, 15 and 16 because of the relatively smaller $S_o/H_o$ ratio.

Tubes having the higher $S_o/H_o$ ratios are particularly efficient under relatively high vacuum conditions. This is because of variations in the viscosity and surface tension of water at the temperatures prevailing under different vacuum conditions. Under a relatively high vacuum of 1.0 p.s.i.a. for example, the temperature of the condensed water will be approximately 100 degrees Fahrenheit, whereas at atmospheric pressure or above the temperature will be at least 212 degrees.

With these considerations in mind, the configuration of the tube shown in FIGURE 9 for example, is particularly well adapted for high vacuum condensers, whereas the tubes shown in FIGURES 11 and 13 are less suitable.

In all of the practical tubes shown in FIGURES 9–16, as well as in FIGURE 18, it will be observed that the internal ridge formation is such as will be produced by the formation of the external fins by tubular fin rolling. As a consequence, the average number of external fins per inch is of course the same as the average number of internal ridges per inch.

As a result of the investigation of a variety of different designs of tubes having both internal and external surface modification, the following requirements have been established: In the first place, it is definitely possible to improve heat transfer characteristics of prime tubing by surface modification thereof. If the external surface of the tube is such as to promote substantial drop-wise condensation, then the internal prime tube surface constitutes the major barrier to heat transfer and is the surface as to which modification produces the greatest increase in heat transfer capacity.

The modification of the internal surface, to promote overall efficiency, must be such as to maintain maximum turbulence in the flow through the tube while at the same time providing a minimum increase in resistance to flow. Thus, with a given pressure drop across a tube, overall heat transfer is increased generally by an increase in turbulence of flow in the tube while the quantity of coolant flowing through the tube is decreased as a result of an increased resistance to flow by the means which promote turbulence. Best results of course, follow the proper balance between the improved heat transfer capacity at the cost of increased flow resistance.

If drop-wise condensation can be maintained on the outer surface of the tube, it is not ordinarily possible to increase heat transfer capacity of the inner surface to a point per unit length where it will exceed the heat transfer capacity of the corresponding exterior surface. However, it is not usually possible to maintain perfect drop-wise condensation and where substantial film-wise condensation occurs at the exterior surface of the tube, it may be desirable to provide for an increase in the heat transfer capacity of the exterior surface in order to prevent the exterior surface from overly limiting overall heat transfer through the tube.

The modification of the internal surface of the tube in order to produce the maximum increase in heat transfer capacity at the expense of as little as possible of increase in resistance to flow, is best accomplished by generally circumferentially extending ridges (either circular or helical) which are relatively low and which have a substantial spacing therebetween, preferably, such that the ratio of ridge spacing $S_i$ to ridge height $H_i$ is in the neighborhood of 10 and at least within the range of 5 to 15. Moreover, the ridge height should be kept as small as possible, the range of .005 to .075", the large values being useful on larger diameter tubes as for example inch and a half tubes.

The internal ridges provided for the purpose of increasing the heat transfer capacity through the inner surface of the tube, are best provided by a rolling operation in which pressure is applied to the exterior surface of the tube, thus producing a groove at the exterior surface of the tube opposite the ridge at the interior surface of the tube. Where it is desirable to increase the heat transfer capacity at the exterior surface of the tube in order to equal the substantially increased heat transfer capacity produced at the interior surface of the tube by modification of the interior surface thereof, this is accomplished by providing extended surface at the exterior of the tube in the form of radially outwardly extending projections referred to herein as fins, the fins of course being opposite the space between adjacent ridges at the interior surface of the tube.

Tests have indicated that where extended surface is required at the exterior of the tube, the fins provided for the purpose of extending the surface should have a mean height of about 0.025–0.050 inch, a mean axial thickness of about 0.050–0.160 inch, and a mean axial spacing of about 0.050–0.085 inch.

In FIGURE 19 there is shown a steam condenser comprising a shell 80, and end cap 82 and tube header plate 84, defining therebetween a chamber 86 and a multiplicity of water tubes 88 in the header and communicating with the interior of the chamber 86. Steam is condensed within the shell 80 between header plate 84, by heat transfer to water circulating within the tubes 88.

The drawings and the foregoing specification constitute a description of the improved steam condenser of the water tube type in such full, clear, concise and exact terms as to enable any person skilled in the art to practice the invention, the scope of which is indicated by the appended claims.

What I claim as my invention is:

1. A water tube for a steam condenser having an overall outside diameter of 0.50–1.50 inches, and having at its inner surface a series of radially inwardly projecting ridge portions extending around said tube, the ratio between the axial spacing of adjacent ridge portions to the radial height thereof being between 5:1 and 15:1, the height of said ridge portions being between 0.005 and 0.075 inch.

2. A tube as defined in claim 1 in which said ridge portions are portions of axially spaced circular ridges.

3. A tube as defined in claim 1 in which said ridge portions are portions of at least one helical ridge.

4. A tube as defined in claim 1 in which the thickness of said ridge portions, measured parallel to the axis, is approximately two or three times the height thereof.

5. A tube as defined in claim 1 in which the maximum ridge height is about .025 inch for a half-inch tube and increases generally proportionally to .075 inch for an inch and a half tube.

6. A water tube for a steam condenser having an overall outside diameter of 0.50–1.50 inches, and having at its inner surface a series of radially inwardly projecting ridge portions extending around said tube, the ratio between the axial spacing of adjacent ridge portions to the radial height thereof being about 10:1, the height of said ridge portions being between 0.005 and 0.075 inch.

7. A tube as defined in claim 6 in which the maximum ridge height is about .025 inch for a half-inch tube and increases generally proportionally to .075 inch for an inch and a half tube.

8. A water tube for a steam condenser having an overall outside diameter of 0.50–1.50 inches, and having at its inner surface a series of radially inwardly projecting ridge portions extending around said tube, the ratio between the axial spacing of adjacent ridge portions to the radial height thereof being between 5:1 and 15:1, the height of said ridge portions being between 0.005 and 0.075 inch, the outer surface of said tube being uniform except that it has axially spaced channels therein each extending in opposite alignment with a ridge on the inner surface of said tube.

9. A tube as defined in claim 8 in which the outer portion of said tube between said channels has a mean height of about 0.025–0.050 inch, a mean axial thickness of about 0.050–0.160 inch, and a mean axial spacing of about 0.050–0.085 inch.

References Cited by the Examiner
UNITED STATES PATENTS

| | | | |
|---|---|---|---|
| 11,409 | 8/1854 | Bristol | 138—38 X |
| 2,118,060 | 5/1938 | Stone et al. | 165—179 |
| 2,181,927 | 12/1939 | Townsend | 165—179 XR |
| 2,227,680 | 1/1941 | Townsend et al. | 165—178 |
| 2,241,209 | 5/1941 | Lea | 165—178 XR |
| 2,279,548 | 4/1942 | Bailey | 165—179 |
| 2,295,988 | 9/1942 | Brace | 138—38 X |
| 2,432,308 | 12/1947 | Goodyear | 210—179 |
| 3,088,494 | 5/1963 | Koch et al. | 138—37 |

LEWIS J. LENNY, *Primary Examiner.*

PERCY L. PATRICK, EDWARD V. BENHAM,
*Examiners.*